United States Patent
Sakai et al.

(10) Patent No.: US 7,760,675 B2
(45) Date of Patent: Jul. 20, 2010

(54) RADIO COMMUNICATION APPARATUS

(75) Inventors: Masashi Sakai, Chiba (JP); Masanori Miyagi, Chiba (JP)

(73) Assignee: Seiko Instruments Inc., Chiba (JP)

( * ) Notice: Subject to any disclaimer, the term of this patent is extended or adjusted under 35 U.S.C. 154(b) by 792 days.

(21) Appl. No.: 11/704,152

(22) Filed: Feb. 8, 2007

(65) Prior Publication Data

US 2007/0200697 A1      Aug. 30, 2007

(30) Foreign Application Priority Data

Feb. 8, 2006    (JP)    ............................ 2006-031202
Feb. 5, 2007    (JP)    ............................ 2007-025843

(51) Int. Cl.
    *G08C 17/00*    (2006.01)
(52) U.S. Cl. ................. 370/311; 455/574; 340/870.02; 340/572.1
(58) Field of Classification Search ............. 370/310.2, 370/318, 311, 313, 328, 315; 455/412.1, 455/414.1, 550.1, 574; 375/141, 145, 219; 340/572.1, 539.1, 573.1, 573.3, 573.4, 447, 340/10.1, 10.41, 853.1, 870.15, 870.21, 870.02
See application file for complete search history.

(56) References Cited

U.S. PATENT DOCUMENTS

2003/0001754 A1*    1/2003    Johnson et al. ......... 340/870.02
2003/0034900 A1*    2/2003    Han ..................... 340/870.02
2008/0204240 A1*    8/2008    Hilgers et al. ............ 340/572.1

FOREIGN PATENT DOCUMENTS

JP          7-322364 A          12/1995

* cited by examiner

*Primary Examiner*—Jean A Gelin
(74) *Attorney, Agent, or Firm*—Brinks Hofer Gilson & Lione

(57) ABSTRACT

Provided is a radio communication apparatus using a battery as a power supply, in which standby electricity is reduced to achieve a reduction in power consumption.

The radio communication apparatus includes a time measuring unit (210) and a plurality of time signal outputting units (220 to 22n) such that a plurality of circuit blocks are intermittently operated for a minimum period of time, only a necessary circuit block is intermittently operated, or an intermittent operation is performed with a minimum power supplied, at desired independent time intervals or after desired independent elapsed time.

7 Claims, 6 Drawing Sheets

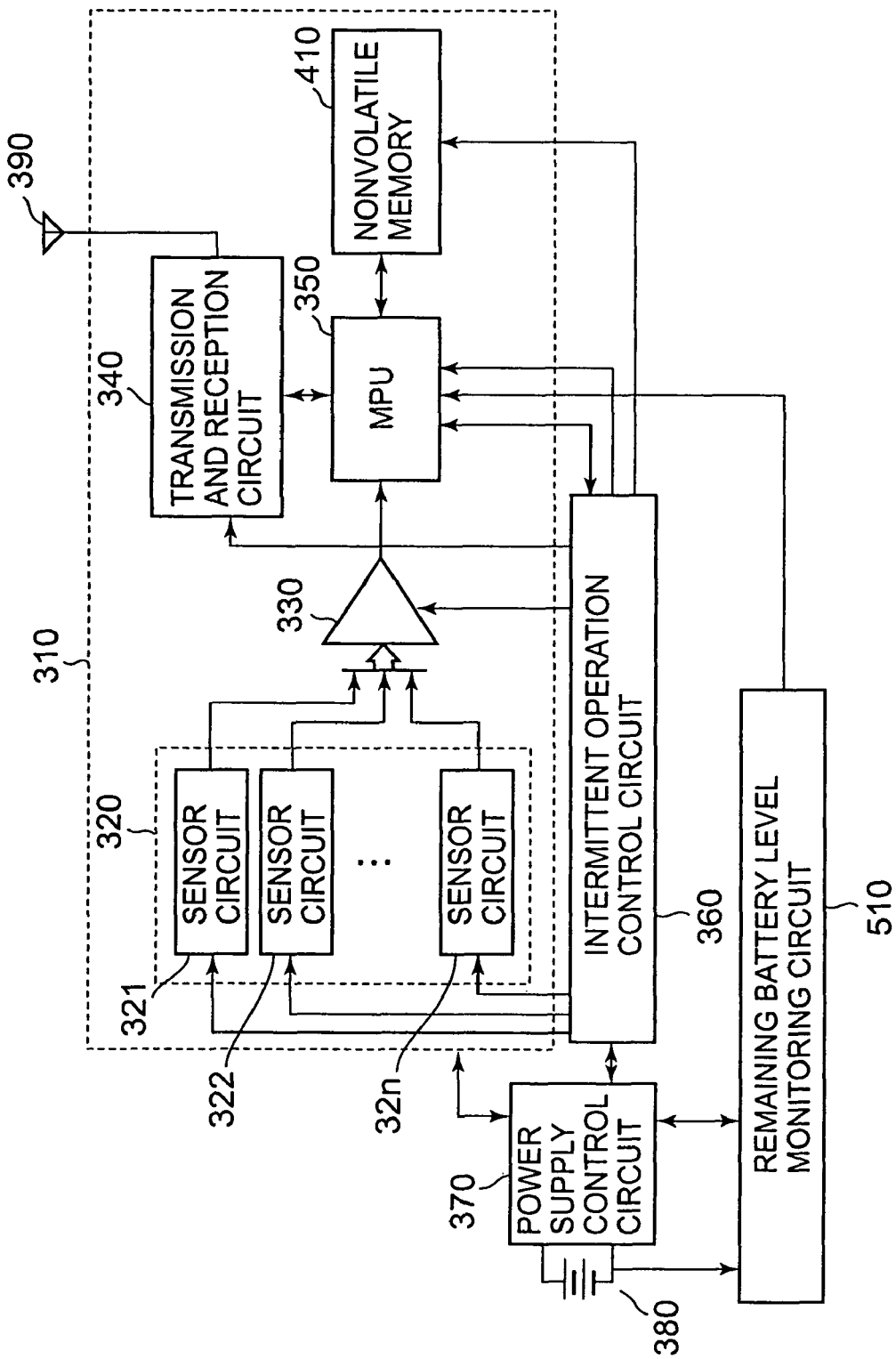

RADIO COMMUNICATION APPARATUS

TECHNICAL FIELD

The present invention relates to a technique of extending the lifetime of a battery used as a power supply in a radio communication system by providing an intermittent operation control function in which signal levels are changed at desired time intervals independent of each other specified by a plurality of time signal outputting means or after desired elapsed time independent of each other specified by the plurality of time signal outputting means to perform time management of the operations of a plurality of circuit blocks, thereby reducing the power consumption.

BACKGROUND ARTS

In a radio communication system, particularly in a portable radio communication system, which uses a battery as a power supply, communications are disabled when the battery is exhausted. In order to allow the radio communication system to operate for a longer period of time even when the battery is used, it is demanded to provide a technique of reducing the power consumption by performing an intermittent operation in which the radio communication system operates only when communications are made and stops its operation in the other periods of time (for example, see JP H07-322364-A2).

FIG. 7 is a circuit block diagram of a remote control device for residence facility equipment, which serves as a radio communication system having an environment observation function. The remote control device includes a reception circuit 110, a transmission circuit 120, a transmission and reception control means 130, a battery 150, a constant voltage circuit 151, a reception-section power source control circuit 160, a transmission-section power source control circuit 170, an operation section 180, and a display section 190. The reception circuit 110 is composed of a first circuit group 117 that includes a VCO circuit 115 and a PLL circuit 116 and a second circuit group 118 that includes an RF circuit 111, a mixer circuit 112, an IF circuit 113, and a DET circuit 114.

The circuits included in the first circuit group 117 need a certain amount of time until their functions become effective after power is supplied, whereas the circuits included in the second circuit group 118 need a shorter period of time until their functions become effective after power is supplied. In other words, the circuits are grouped into the first circuit group 117 and the second circuit group 118 depending on time for which the circuit functions need to be effective. The reception-section power source control circuit 160 controls power supply timing to reduce power consumed for signal waiting in the respective circuit groups.

However, the above-mentioned conventional radio communication system has a problem in that the power consumption is not efficiently reduced because no consideration is given to circuits, such as the transmission and reception control means 130, which do not need to be operated while the transmission circuit and the reception circuit are being operated.

In the above-mentioned conventional radio communication system which includes a plurality of circuit blocks, a reduction in power consumption of each of the plurality of circuit blocks is not realized.

Specifically, in a wireless sensor network system serving as a radio communication system having a meter reading system for gas, water, and electricity or a radio communication system having an observation system for natural environments that include air temperature, room temperature, humidity, and illuminance, during transmission and reception of radio wave signals in the radio communication system, a circuit block of the meter reading system or the observation system does not need to be operated. Further, in the meter reading system or the observation system, during meter reading or observation, a circuit block having a function of transmitting and receiving radio wave signals does not need to be operated.

The present invention has been made to solve the above-mentioned problem, and therefore, it is an object of the present invention to provide a radio communication system having a meter reading system or an observation system, which does not need to replace a battery frequently by extending the lifetime of a battery of a wireless sensor network system.

SUMMARY OF THE INVENTION

In order to attain the above-mentioned object, according to the present invention, there is provided a radio communication apparatus which transmits and receives data measured by a plurality of sensor circuits and information necessary to control the radio communication apparatus, including: a sensor circuit section having the plurality of sensor circuits; an analog-digital converter for converting an output signal of the sensor circuit section into a digital signal; an MPU for controlling signal processing of the analog-digital converter; a transmission and reception circuit for transmitting and receiving the digital signal and the information necessary to control the radio communication apparatus; and an intermittent operation control circuit including a time measuring means for measuring time and a plurality of time signal outputting means for outputting output signals at time intervals desirably specified in advance by the time measuring means or after elapsed time desirably specified in advance by the time measuring means, the intermittent operation control circuit controlling intermittent operations of the sensor circuit section, the analog-digital converter, the MPU, and the transmission and reception circuit according to the output signals of the plurality of time signal outputting means.

According to the present invention, the intermittent operation control function in which signal levels are changed at desired time intervals independent of each other specified by the plurality of time signal outputting means or after desired elapsed time independent of each other specified by the plurality of time signal outputting means is provided to perform time management of the operations of a plurality of circuit blocks. In addition, a semiconductor memory device such as a nonvolatile memory is used and various types of observation data are collectively transmitted, thereby reducing the number of times of driving a transmission and reception circuit. Therefore, the power consumption is reduced and the lifetime of a battery is extended. Further, a real time clock function is provided so that an operation can be performed intermittently in units of years, months, days, hours, minutes, or seconds. Furthermore, a serial data input/output means is provided so that operation time of the plurality of circuit blocks can be desirably specified at any time.

BRIEF DESCRIPTION OF THE DRAWINGS

FIG. 8 is a block diagram of a radio communication apparatus having an intermittent operation control circuit according to a fifth embodiment of the present invention.

DESCRIPTION OF THE PREFERRED EMBODIMENTS

First Embodiment

Figure 1:
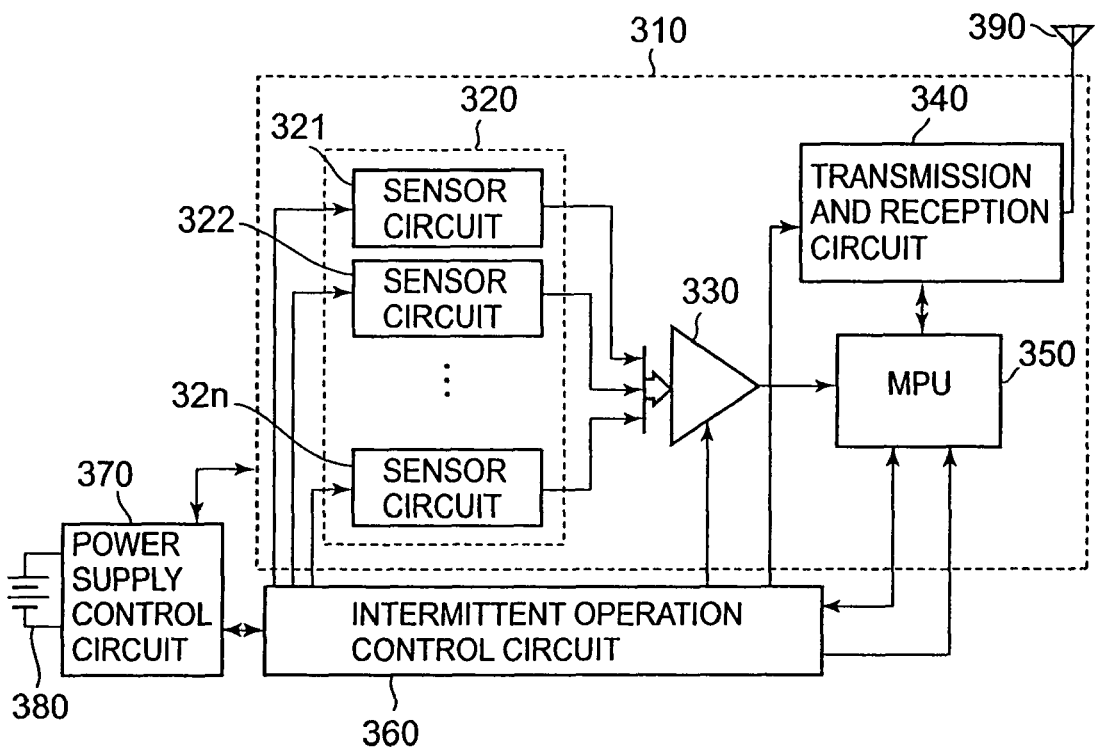
FIG. 1 is a block diagram of a radio communication apparatus using an intermittent operation control circuit according to a first embodiment of the present invention.

FIG. 1 is a block diagram of a radio communication apparatus having an intermittent operation control circuit according to a first embodiment of the present invention.

The radio communication apparatus includes a wireless sensor network system section 310, an intermittent operation control circuit 360, a power supply control circuit 370, a battery 380, and an antenna 390. The wireless sensor network system section 310 includes a sensor circuit section 320, an analog-digital converter (ADC) 330, a transmission and reception circuit 340, and an MPU 350. The sensor circuit section 320 includes a plurality of sensor circuits 321 to 32$n$ having various environment observation functions of observing natural environments that include air temperature, room temperature, humidity, and illuminance. The sensor circuits 321 to 32$n$ each have a function of converting an observation result into an analog electrical signal and outputting the analog electrical signal.

The ADC 330 converts analog electrical signals outputted from the plurality of sensor circuits 321 to 32$n$, which have various environment observation functions, into digital electrical signals and outputs the digital electrical signals. In order to convert analog electrical signals outputted from the plurality of sensor circuits 321 to 32$n$ into digital electrical signals in the single ADC 330, the ADC 330 has a function of allowing wired-OR connection of the signals outputted from the plurality of sensor circuits 321 to 32$n$ and sending a digital electrical signal to the MPU 350.

The transmission and reception circuit 340 transmits and receives radio wave signals via the antenna 390. For example, the transmission and reception circuit 340 receives information necessary to control the radio communication apparatus. The information includes a command for remotely selecting the sensor circuits 321 to 32$n$, which have various environment observation functions, and setting information, such as time interval or elapsed time of observation. The transmission and reception circuit 340 also transmits to a remote location an observation result (digital signal) which is observed by the sensor circuit section 320 and information such as elapsed time from the observation start which is received from the intermittent operation control circuit 360.

The MPU 350 transmits the selection command information sent from the transmission and reception circuit 340 to the sensor circuit section 320 and the setting time information, such as the time interval and elapsed time of observation, sent from the transmission and reception circuit 340 to the intermittent operation control circuit 360, via a serial data input/output means provided in the intermittent operation control circuit 360. The MPU 350 receives a digital signal of an observation result of the sensor circuit section 320 sent from the ADC 330 or receives information on, for example, the elapsed time from the observation start, to transmit the information to the transmission and reception circuit 340 via a serial data input/output means. In other words, the MPU 350 controls signal processing of the ADC 330.

The intermittent operation control circuit 360 measures time using a time measuring function based on the setting time information such as the time interval or elapsed time of observation transmitted from the MPU 350 via the serial data input/output means, and intermittently controls the start and stop of the operation of each of circuit blocks, i.e., the sensor circuit section 320, the ADC 330, the transmission and reception circuit 340, and the MPU 350 of the wireless sensor network system section 310, according to on/off signals outputted from a plurality of time signal outputting means to the respective circuit blocks, thereby controlling the intermittent operation. Since the sensor circuit section 320 includes the plurality of sensor circuits 321 to 32$n$ for observing natural environments that include air temperature, room temperature, humidity, and illuminance, it is also possible to intermittently control the start and stop of the operation of each of the respective sensor circuits 321 to 32$n$ of the sensor circuit section 320. The time measuring function not only observes environments at specified period of time determined by the time interval or elapsed time of observation, transmitted from the MPU 350 via the serial data input/output means but also measures, for example, a period of time for which a sensor circuit of the sensor circuit section 320 continuously observes an air temperature of 30° C. or more from a time point at which the sensor circuit first observes an air temperature of 30° C.

The power supply control circuit 370 receives a power on/off control signal from the intermittent operation control circuit 360 at a desirably specified time to intermittently supply power to the wireless sensor network system section 310. The wireless sensor network system section 310, observing natural environments that include air temperature, room temperature, humidity, and illuminance, does not need to always observe everything. In many cases, observation needs to be performed at desired intervals or after desired elapsed time, for example, every several tens of minutes, every several hours, every several months, or the like. Thus, with the power supply control circuit 370, an efficient reduction in power consumption can be realized when intermittent power-supply control is applied to the wireless sensor network system section 310. The power supply control circuit 370 is realized by a power supply switch or a voltage regulator.

As the battery 380 serving as a power supply, a battery or a solar battery is used. The battery 380 is connected to the power supply control circuit 370 and to the intermittent operation control circuit 360 to supply power thereto.

Figure 2:
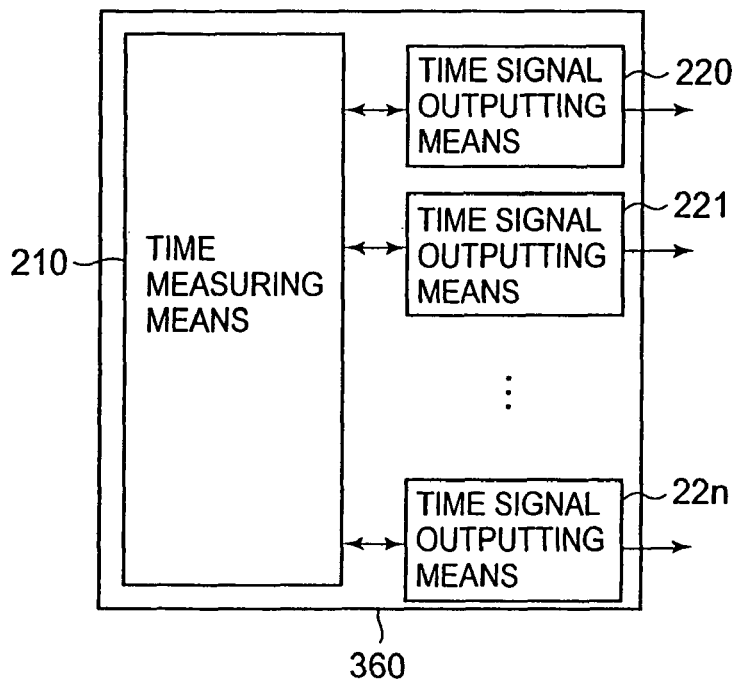
FIG. 2 is a block diagram of the intermittent operation control circuit according to the first embodiment of the present invention.

FIG. 2 is a block diagram of the intermittent operation control circuit 360 of the first embodiment of the present invention. The intermittent operation control circuit 360 includes a time measuring means 210 and time signal outputting means 220 to 22$n$. In the time measuring means 210, a time interval or elapsed time is desirably specified in advance and is also desirably specified from the outside. The time measuring means 210 outputs measured time to the outside. The time signal outputting means 220 to 22$n$ output an inversion signal at time intervals desirably specified in advance by the time measuring means 210, or after elapsed time desirably specified in advance by the time measuring means 210.

As described above, with the intermittent operation control function, signals are outputted at desired time intervals independent of each other specified by the plurality of time signal outputting means or after desired elapsed time independent of each other specified by the plurality of time signal outputting means to perform time management of the operations of the plurality of circuit blocks, thereby realizing a reduction in power consumption and extending the lifetime of the battery.

Second Embodiment

Figure 3:
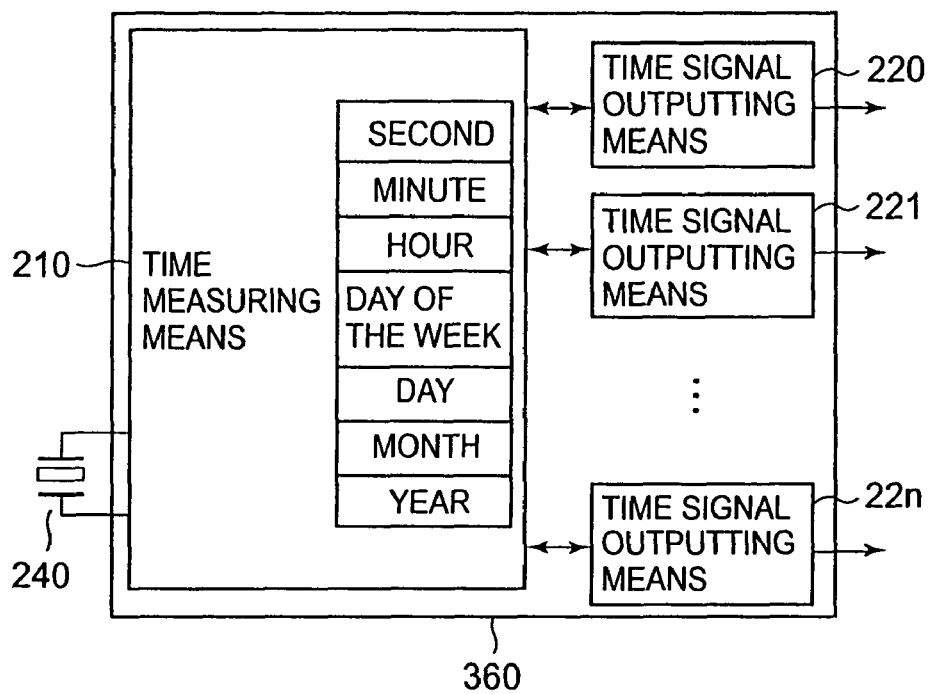
FIG. 3 is a block diagram of an intermittent operation control circuit according to a second embodiment of the present invention.

FIG. 3 is a block diagram of an intermittent operation control circuit 360 according to a second embodiment of the present invention. The intermittent operation control circuit 360 includes the time measuring means 210, the time signal outputting means 220 to 22n, and a crystal oscillator 240. As to the time measuring means 210, a time interval or elapsed time can be desirably specified in advance in units selected from the group consisting of years, months, days, days of the week, hours, minutes, and seconds by a real time clock function. The time signal outputting means 220 to 22n output an inversion signal at time intervals or after elapsed time desirably specified in advance by the time measuring means 210.

Third Embodiment

Figure 4:
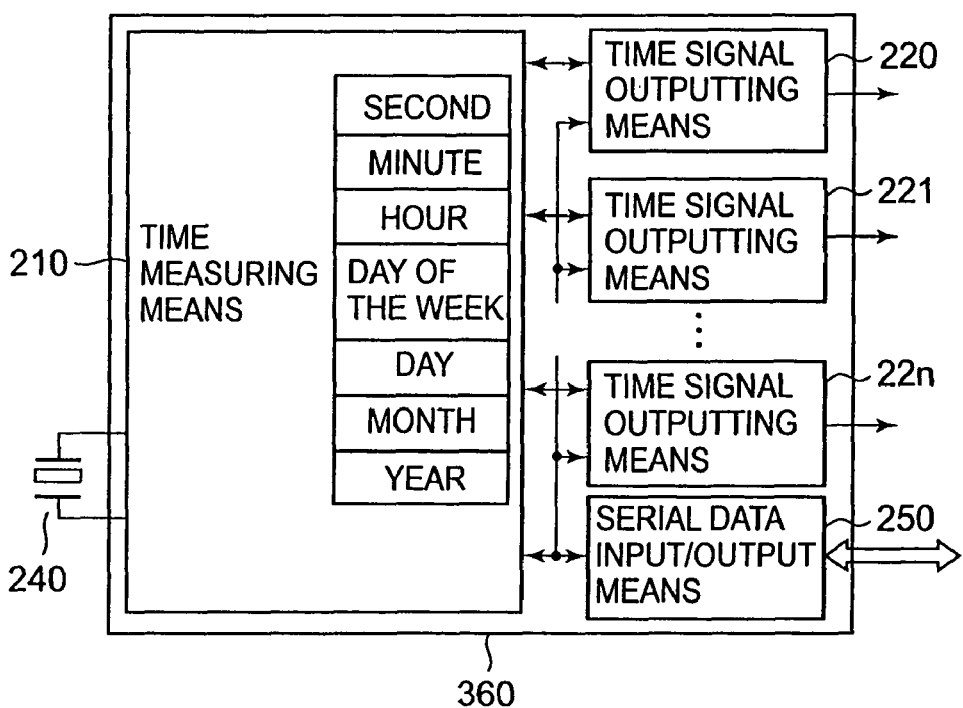
FIG. 4 is a block diagram of an intermittent operation control circuit according to a third embodiment of the present invention.
Figure 5:
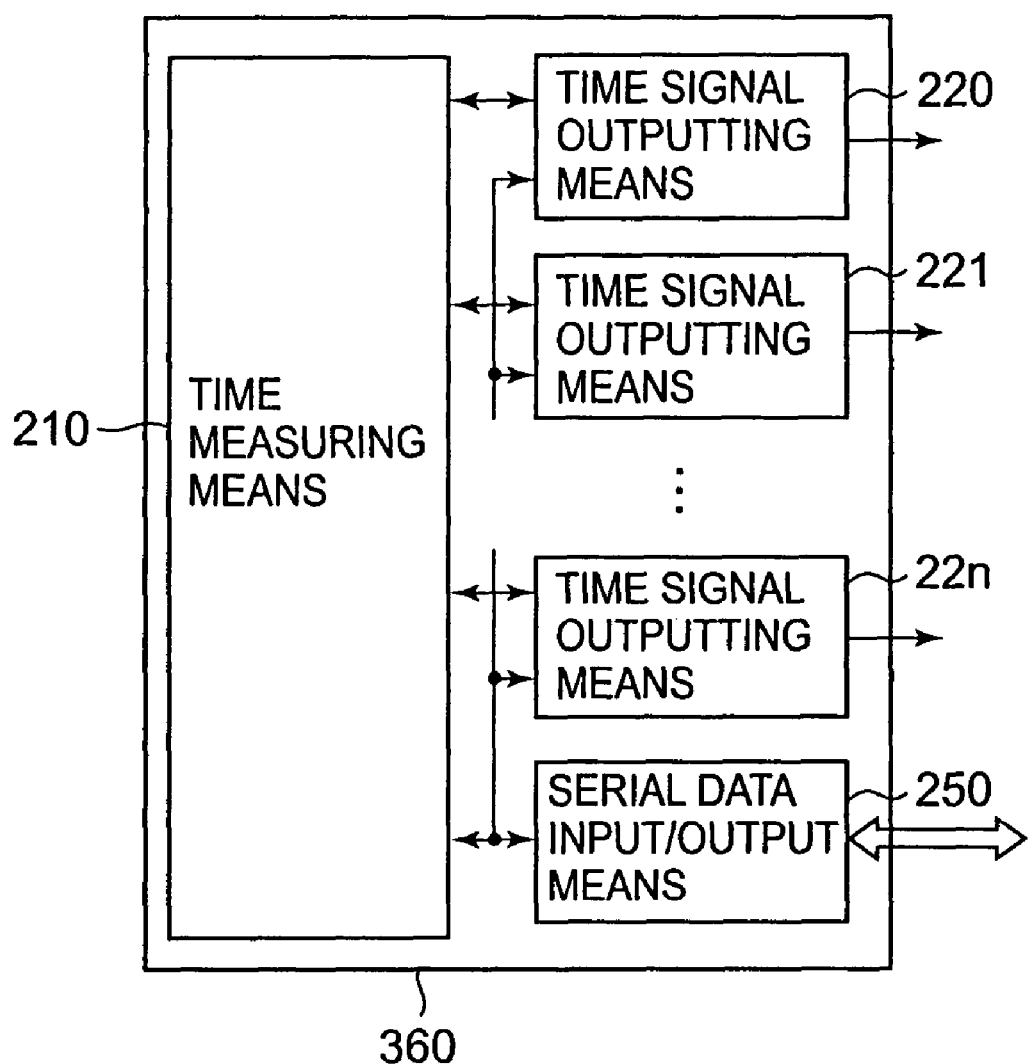
FIG. 5 is a block diagram of an intermittent operation control circuit according to the third embodiment of the present invention.

FIGS. 4 and 5 are block diagrams of intermittent operation control circuits 360 according to a third embodiment of the present invention. Unlike the intermittent operation control circuits 360 of FIGS. 2 and 3, the intermittent operation control circuits 360 of FIGS. 4 and 5 are provided with a serial data input/output means 250.

With the serial data input/output means 250, it is possible to externally specify a desired time interval or elapsed time of the time measuring means 210 by sending data to the serial data input/output means 250. The serial data input/output means 250 has a function of notifying the outside of a time interval or elapsed time measured by the time measuring means 210.

The time signal outputting means 220 to 22n output an inversion signal at time intervals or after elapsed time desirably specified by the time measuring means 210.

As described above, with the function of controlling desired time intervals or elapsed time independent of each other specified by the plurality of time signal outputting means, by external serial data, more appropriate reduction in power consumption can be realized, resulting in an extended lifetime of the battery.

Fourth Embodiment

Figure 6:
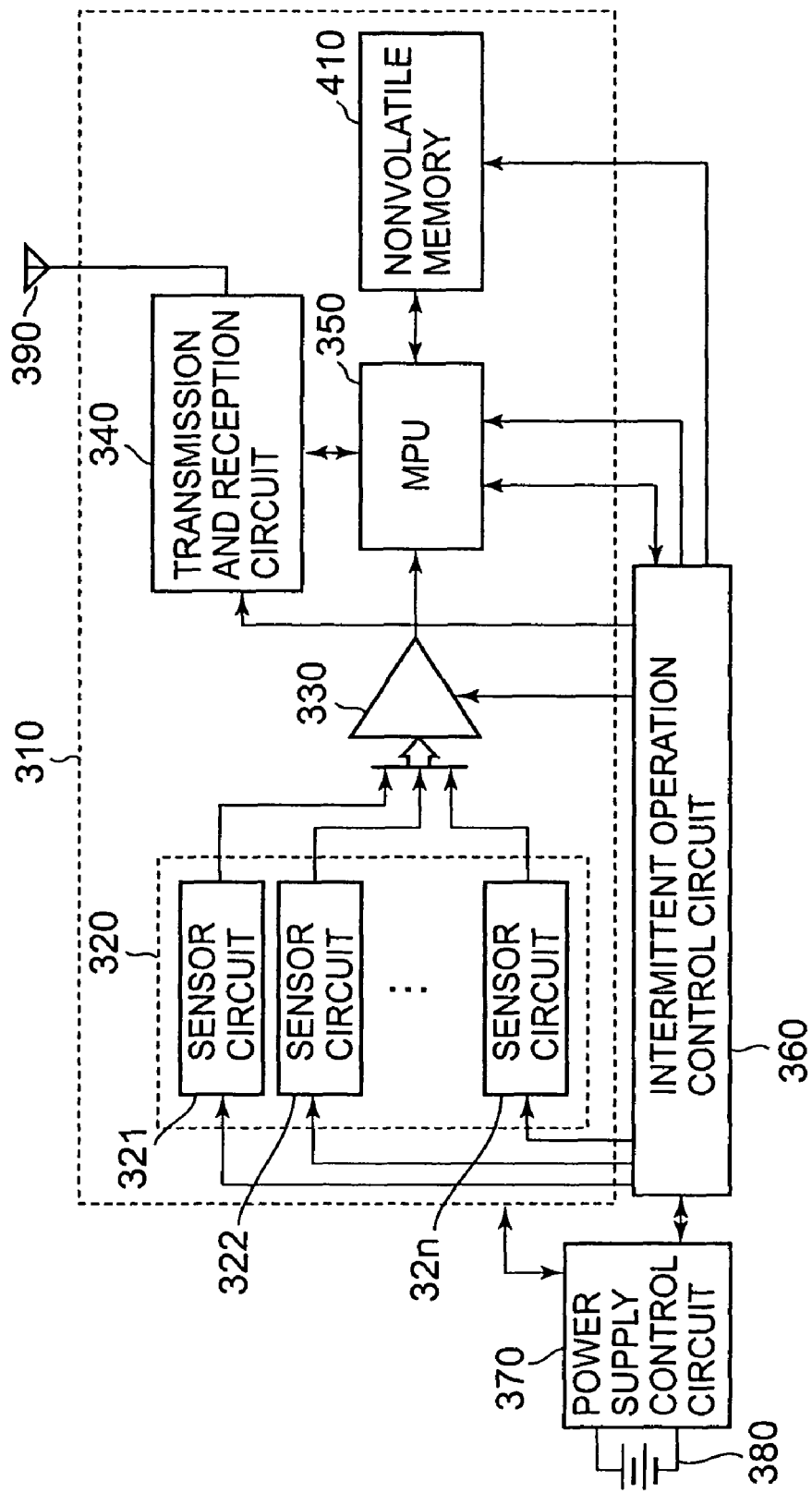
FIG. 6 is a block diagram of a radio communication apparatus having an intermittent operation control circuit according to a fourth embodiment of the present invention.
Figure 7:
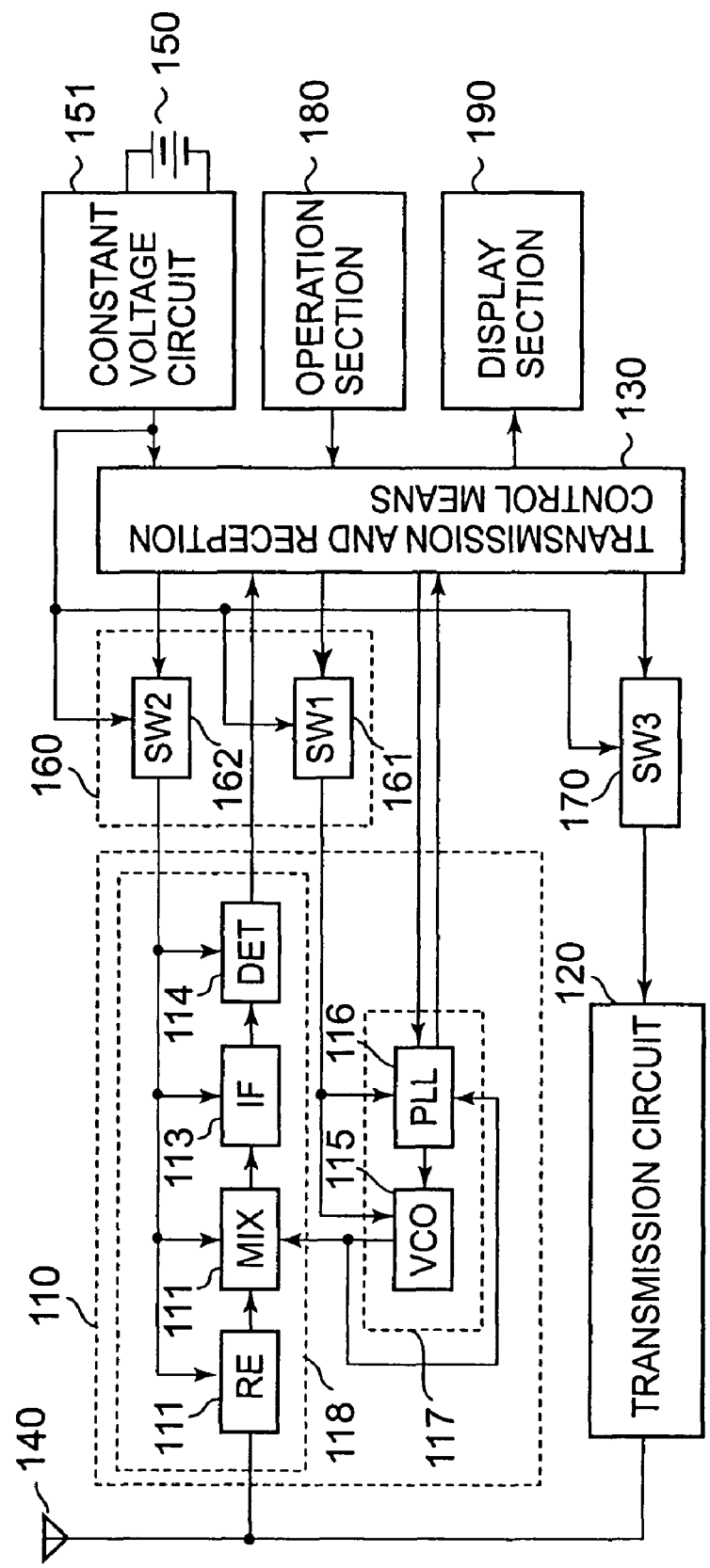
FIG. 7 is a block diagram of a radio communication apparatus of a conventional radio communication system.

FIG. 6 is a block diagram of a radio communication apparatus having an intermittent operation control circuit 360 according to a fourth embodiment of the present invention. The radio communication apparatus of FIG. 6 is obtained by adding a nonvolatile memory 410 to that of FIG. 1.

The nonvolatile memory 410 is configured by a HYPERLINK "http://e-words.jp/w/E58D8AE5B08EE4BD93.html" semiconductor HYPERLINK "http://e-wordsjp/w/E383A1E383A2E383AA.html" memory device, such as an EEPROM, which can hold a memory content even when the power is turned off, and temporarily stores various types of observation data of the sensor circuit section 320 as digital signals.

With the nonvolatile memory 410, the MPU 350 can control the transmission and reception circuit 340 so as to collectively transmit digital signals temporarily stored in the nonvolatile memory 410, indicating various types of observation data, at time intervals desirably specified in advance by the time measuring means 210 and the time signal outputting means 220 to 22n of the intermittent operation control circuit 360, so as to collectively transmit the digital signals after elapsed time desirably specified in advance by the time measuring means 210 and the time signal outputting means 220 to 22n of the intermittent operation control circuit 360, so as to collectively transmit the digital signals at time intervals desirably specified through the serial data input/output means 250, or so as to collectively transmit the digital signals after elapsed time desirably specified through the serial data input/output means 250.

In other words, with the nonvolatile memory 410, various types of observation data obtained at different timing are not transmitted at different timing but transmitted collectively. Therefore, power consumption can be reduced, thereby extending the lifetime of the battery.

Fifth Embodiment

FIG. 8 is a block diagram of a radio communication apparatus having an intermittent operation control circuit 360 according to a fifth embodiment of the present invention. The radio communication apparatus of FIG. 8 is obtained by adding a remaining battery level monitoring circuit 510 to that of FIG. 6.

The remaining battery level monitoring circuit 510 monitors the remaining amount of a battery which supplies power to the system. When the remaining amount is low, the remaining battery level monitoring circuit 510 outputs a signal indicating that the remaining amount is low to the transmission and reception circuit 340 via the MPU 350. The transmission and reception circuit 340 notifies a remote location of the battery replacement time. The remaining battery level monitoring circuit 510 can also stop the system when the remaining amount of the battery becomes low.

With the remaining battery level monitoring circuit 510, an error in operation and observation of the system is eliminated, thereby improving the reliability of observation data.

The invention claimed is:

1. A wireless sensor device comprising:
   a battery that effects a finite supply of electricity to the wireless sensor device, which has no other power source;
   a plurality of sensors powered by the battery to make detections and configured to be individually and separately powered on and off, wherein at least one of the sensors comprises an environment sensor configured to detect an environment parameter;
   a communicator powered by the battery to wirelessly transmit detection results from the plurality of sensors and wirelessly receive instructions, the communicator being configured to be separately and individually powered on and off; and
   an operation controller programmed to separately and individually turn on and turn off the plurality of sensors and the communicator according to time schedules programmed respectively for the plurality of sensors and the communicator.

2. The wireless sensor device according to claim 1, wherein the time schedules are made of any of a year, a month, a day, a week, an hour, a minute and a second.

3. The wireless sensor device according to claim 1, wherein the operational controller is programmable with a new time schedule by an instruction received by the communicator.

4. The wireless sensor device according to claim 1, further comprising a non-volatile memory powered by the battery to store detection results from the plurality of sensors and configured to separately and individually powered on and off, wherein the operation controller is programmed to power on and off the volatile memory to transmit the stored detection results according to a time schedule independent of time schedules for powering on and off the plurality of sensors.

5. The wireless sensor device according to claim 1, further comprising a battery monitor configured to monitor the electricity supply from the battery to transmits a warning when the supply becomes low.

6. The wireless sensor device according to claim 1, further comprising a battery monitor configured to monitor the electricity supply from the battery and turn off the wireless sensor when it detects that the electricity supply becomes low.

7. The wireless sensor device according to claim 1, wherein at least one of the sensors measures one of a temperature, a humidity and a light intensity.

* * * * *